US008166640B2

(12) United States Patent
Huang

(10) Patent No.: US 8,166,640 B2
(45) Date of Patent: May 1, 2012

(54) TERMINAL PRESSING MOLD ASSEMBLY

(75) Inventor: Pao-shing Huang, Hsien Shi Town (TW)

(73) Assignee: K.S. Terminals Inc., Chang Hwa County (TW)

( * ) Notice: Subject to any disclaimer, the term of this patent is extended or adjusted under 35 U.S.C. 154(b) by 478 days.

(21) Appl. No.: 12/569,070

(22) Filed: Sep. 29, 2009

(65) Prior Publication Data

US 2011/0041328 A1 Feb. 24, 2011

(30) Foreign Application Priority Data

Aug. 21, 2009 (TW) .............................. 98128153 A

(51) Int. Cl.
*B23P 19/00* (2006.01)
*H01R 43/042* (2006.01)

(52) U.S. Cl. ................ 29/753; 29/718; 29/747; 29/748; 29/761; 439/395; 439/398

(58) Field of Classification Search .................... 29/753, 29/718, 747, 748, 757, 761; 439/395, 398, 439/399, 417, 677, 733.1, 942
See application file for complete search history.

(56) References Cited

U.S. PATENT DOCUMENTS 3,854,114 A * 12/1974 Kloth et al. .................. 439/398
5,997,337 A * 12/1999 Torii ............................ 439/399

* cited by examiner

*Primary Examiner* — Thiem Phan
(74) *Attorney, Agent, or Firm* — Ming Chow; Sinorica, LLC

(57) ABSTRACT

Provided is a terminal pressing mold assembly including a first mold and a second mold having a projection. The first mold includes a main body, a pair of claws, and a groove. The main body includes a pair of first connecting portions. The claws each include a second connecting portion for adjoining a corresponding one of the first connecting portions, and adjoin the main body to thereby form the groove and a first slit between the claws. A second slit is formed between the main body and each of the claws. The claws include a pair of first guiding edges spaced apart by a first width. The projection includes a pair of second guiding edges spaced apart by a second width. The second width is not greater than the first width. The difference between the first and second widths is not greater than the width of the first slit.

14 Claims, 6 Drawing Sheets

TERMINAL PRESSING MOLD ASSEMBLY

BACKGROUND OF THE INVENTION

1. Technical Field

The present invention relates to terminal pressing mold assemblies, and more particularly, to a terminal pressing mold assembly with separable claws.

2. Description of Related Art

A variety of transmission lines are widely used in different industries and different electrical facilities to enable quick transmission of data, signals, and electricity. The application of transmission lines speeds up receipt of information and renders daily life more convenient than ever before.

In a conventional manufacturing process of transmission lines, it is necessary to press an electric wire against a connection terminal so as for the electric wire to be connected to other electrical facilities or transmission lines via the connection terminal. Pressing an electric wire against a connection terminal entails positioning the electric wire in a groove 93 of a fastening element 91 (seeing FIG. 1) and then pressing the electric wire and the connection terminal together using a pressing element 92. The fastening element 91 and the pressing element 92, which are well known in the related art, have their own drawbacks. For example, an electric wire thus pressed against a connection terminal by means of the fastening element 91 and pressing element 92 usually ends up being stuck in the groove 93 of the fastening element 91, and has to be eventually removed from the fastening element 91 by hand or by a tool. As a result, the conventional manufacturing process of transmission lines is time-consuming and unfit for automation.

After long use of the fastening element 91 and the pressing element 92, the wire-contact surface of the groove 93 of the fastening element 91 is likely to crack because of fatigue, and cracks thus developed in the fastening element 91 prevents an electric wire from being tightly pressed against a connection terminal to the detriment of quality. Ultimately, the defective fastening element 91 has to be replaced, and thus production costs increase.

In view of the above drawbacks of the prior art, it is imperative to put forth a terminal pressing mold assembly with a fastening element effective in receiving therein and removing therefrom an electric wire and yet unlikely to crack.

BRIEF SUMMARY OF THE INVENTION

To overcome the above drawbacks of the prior art, the present invention provides a terminal pressing mold assembly, essentially comprising a first mold provided with a groove and a second mold provided with a projection corresponding in position to and insertable into the groove, and characterized in that: the first mold comprises a main body and a pair of claws, the main body being provided with a pair of first connecting portions, and the pair of claws each being provided with a second connecting portion for connection with the first connecting portions to thereby connect the pair of claws and the main body, so as to form a first slit and the groove between the pair of claws and form a second slit between the main body and each of the claws, wherein a pair of first guiding edges spaced apart by a first width are formed on outer sides of the pair of claws, respectively; and a pair of second guiding edges spaced apart by a second width and extended from a top side of the second mold are formed on two sides of the projection, the second width being not greater than the first width, wherein the difference between the second width and the first width is not greater than the width of the first slit.

Hence, it is a primary objective of the present invention to provide a terminal pressing mold assembly having a pair of separable claws and a groove and characterized in that the claws are spaced apart by a first width for preventing an electric wire from being stuck in the groove.

Another objective of the present invention is to provide a terminal pressing mold assembly effective in receiving therein and removing therefrom an electric wire and thereby fit for use with automated production equipment so as to enhance the efficiency of production.

Yet another objective of the present invention is to provide a terminal pressing mold assembly characterized by a pair of separable claws reinforceable and thus conducive to extension of the service life of the claws.

A further objective of the present invention is to provide a terminal pressing mold assembly having a pair of separable claws and a groove and characterized in that the claws can be replaced independently when two sides of the groove crack, so as to cut maintenance costs.

DETAILED DESCRIPTION OF THE INVENTION

The present invention provides a terminal pressing mold assembly. The basic principle of terminal and electric wire processing disclosed in the present invention is comprehensible to persons skilled in the art and thus is not described in detail hereunder. The accompanying drawings are intended to illustrate the technical features of the present invention and thus do not, and need not, depict real-life dimensions.

Figure 1:
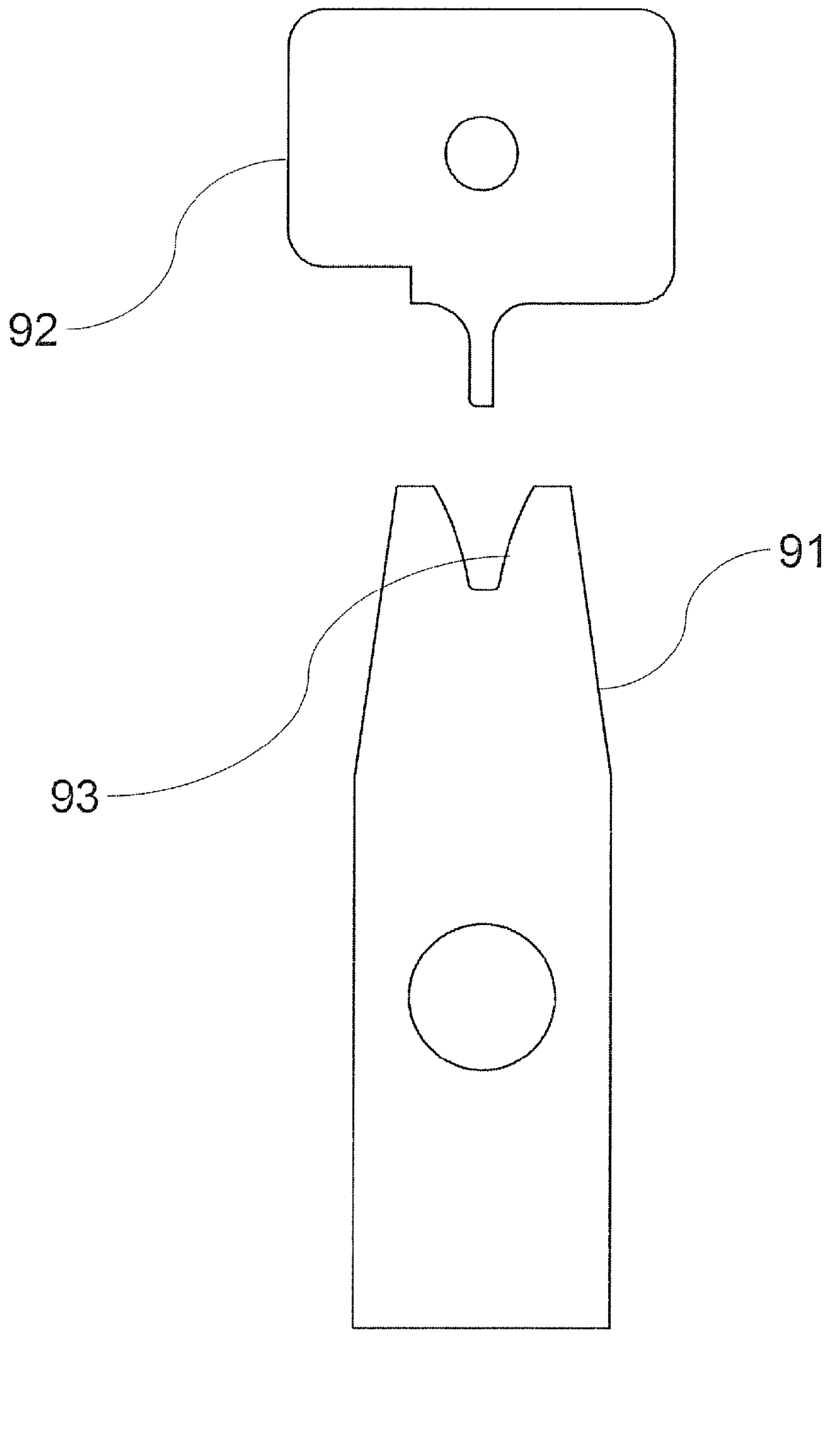
Fig.1 (Prior art)
FIG. 1 is a schematic view of a conventional terminal pressing mold assembly.
Figure 2A:
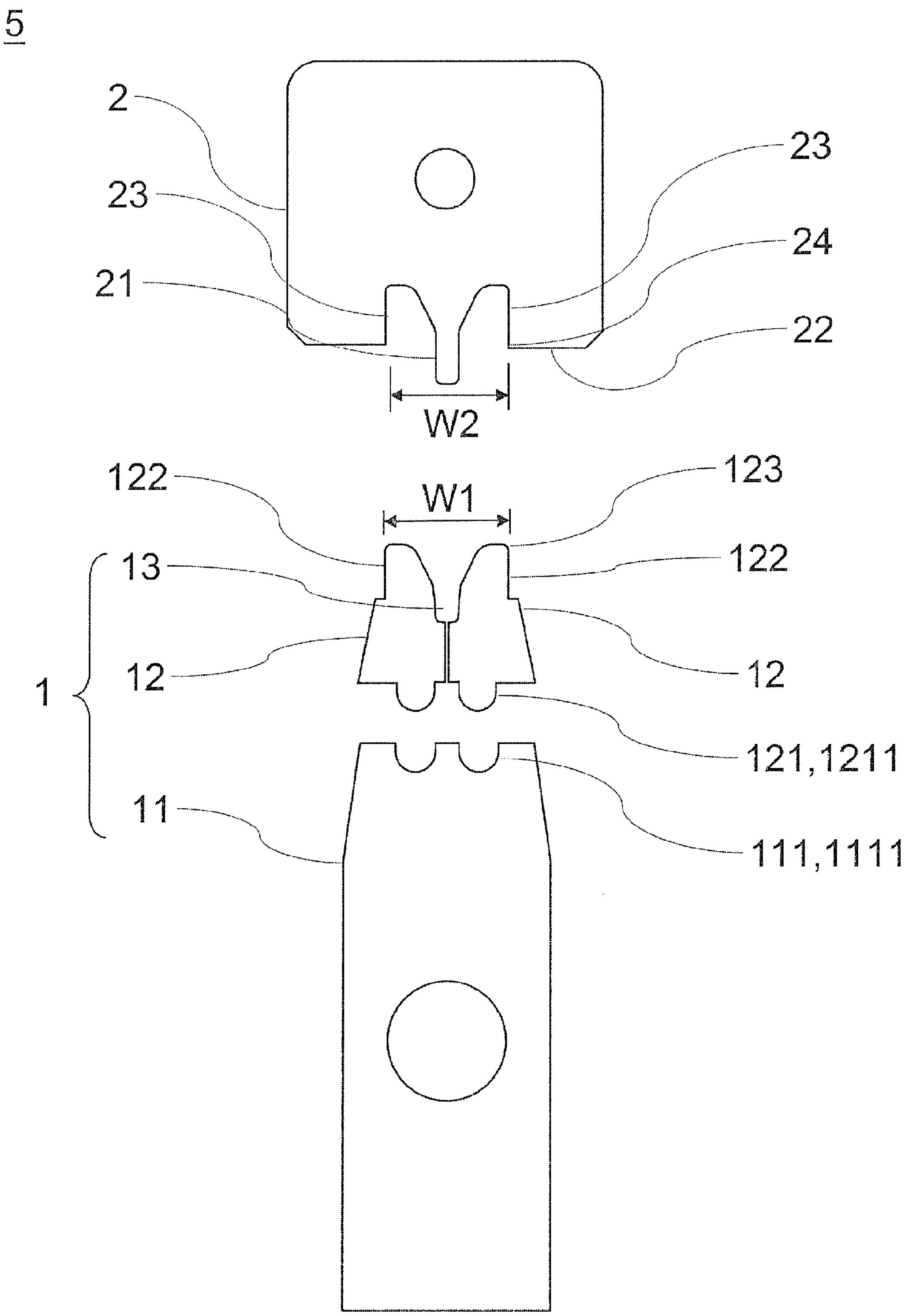
FIG. 2A is a schematic view of a first embodiment of the framework of a terminal pressing mold assembly according to the present invention.

Referring to FIG. 2A, there is shown a schematic view of a first embodiment of the framework of a terminal pressing mold assembly according to the present invention. As shown in the drawing, a terminal pressing mold assembly 5 essentially comprises a first mold 1 and a second mold 2. The first mold 1 is provided with a groove 13. The second mold 2 is provided with a projection 21 corresponding in position to and insertable into the groove 13. The first mold 1 comprises a main body 11 and a pair of claws 12. The main body 11 is provided with a pair of first connecting portions 111. The claws 12 are symmetric and each provided with a second connecting portion 121 for connection with a corresponding said first connecting portion 111 to thereby connect the claws 12 and the main body 11. Each of the first connecting portions 111 is preferably a round-bottomed dent portion 1111 while each of the second connecting portions 121 is preferably a round-headed protrusion portion 1211. A pair of first guiding edges 122 spaced apart by a first width W1 are formed on outer sides of the pair of claws 12, respectively. A pair of second guiding edges 23 spaced apart by a second width W2 and extended from a top side 22 of the second mold 2 are formed on two sides of the projection 21. The second width W2 is not greater than the first width W1. For better performance, the second width W2 is preferably less than the first width W1. Also, a first guiding cape 123 is formed at a joint between each of the first guiding edges 122 and a corresponding said claw 12. A second guiding cape 24 is formed at a joint between each of the second guiding edges 23 and the top side 22 of the second mold 2. The first guiding cape 123 and the second guiding cape 24 are both of chamfered shapes or right-angle shapes as needed.

Figure 2B:
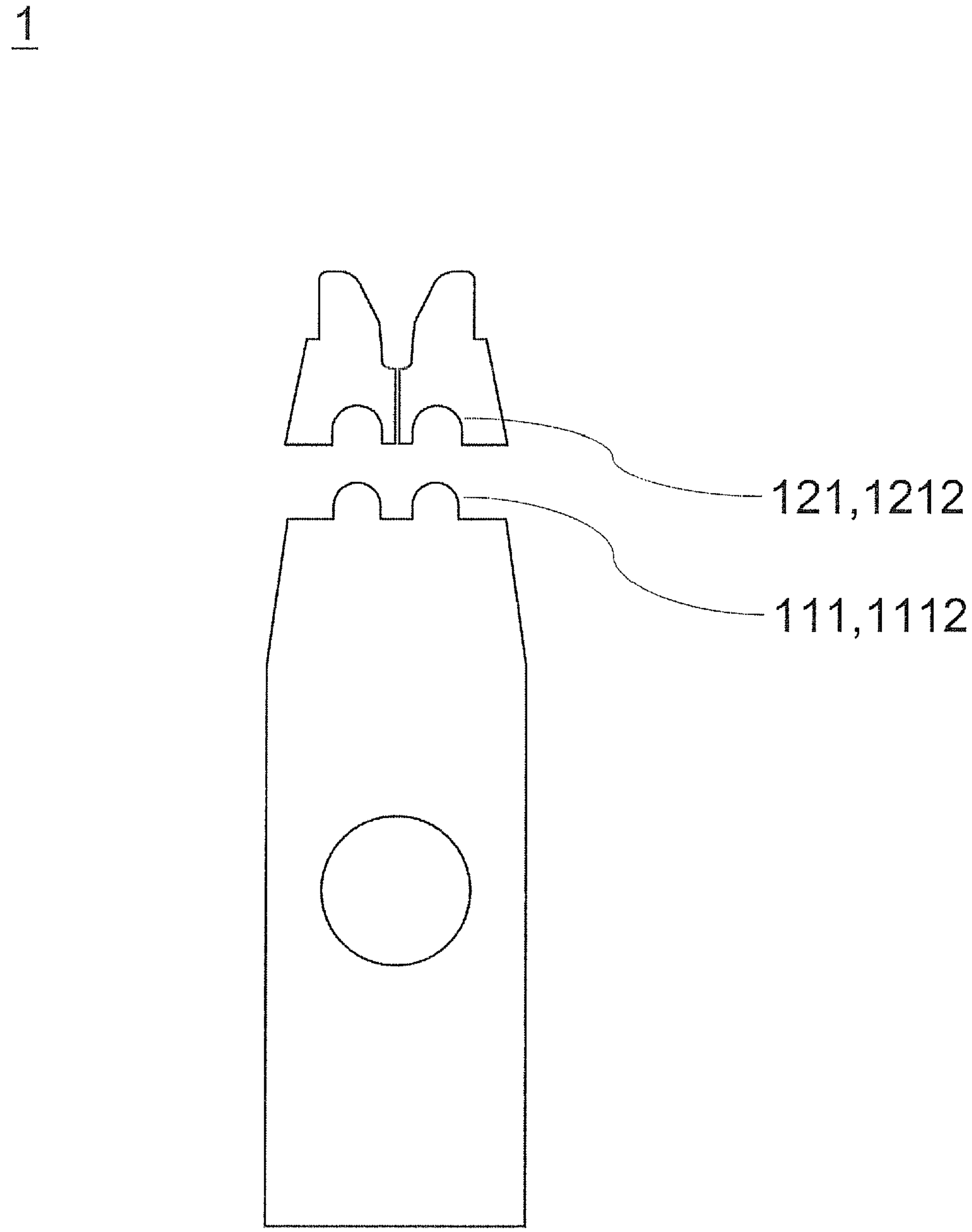
FIG. 2B is a schematic view of a second embodiment of a first connecting portion and a second connecting portion according to the present invention.

Referring to FIG. 2B, the first connecting portion 111 and the second connecting portion 121 are provided in the form of a protrusion portion and a dent portion, respectively. As shown in the drawing, for better performance, the first connecting portion 111 is preferably a round-headed protrusion portion 1112, and the second connecting portion 121 is preferably a round-bottomed dent portion 1212.

Although the first connecting portion 111 and the second connecting portion 121 are preferably round shaped, the first connecting portion 111 and the second connecting portion 121 can be of any other shapes as needed, such as taper-shaped or wedge-shaped.

Figure 3A:
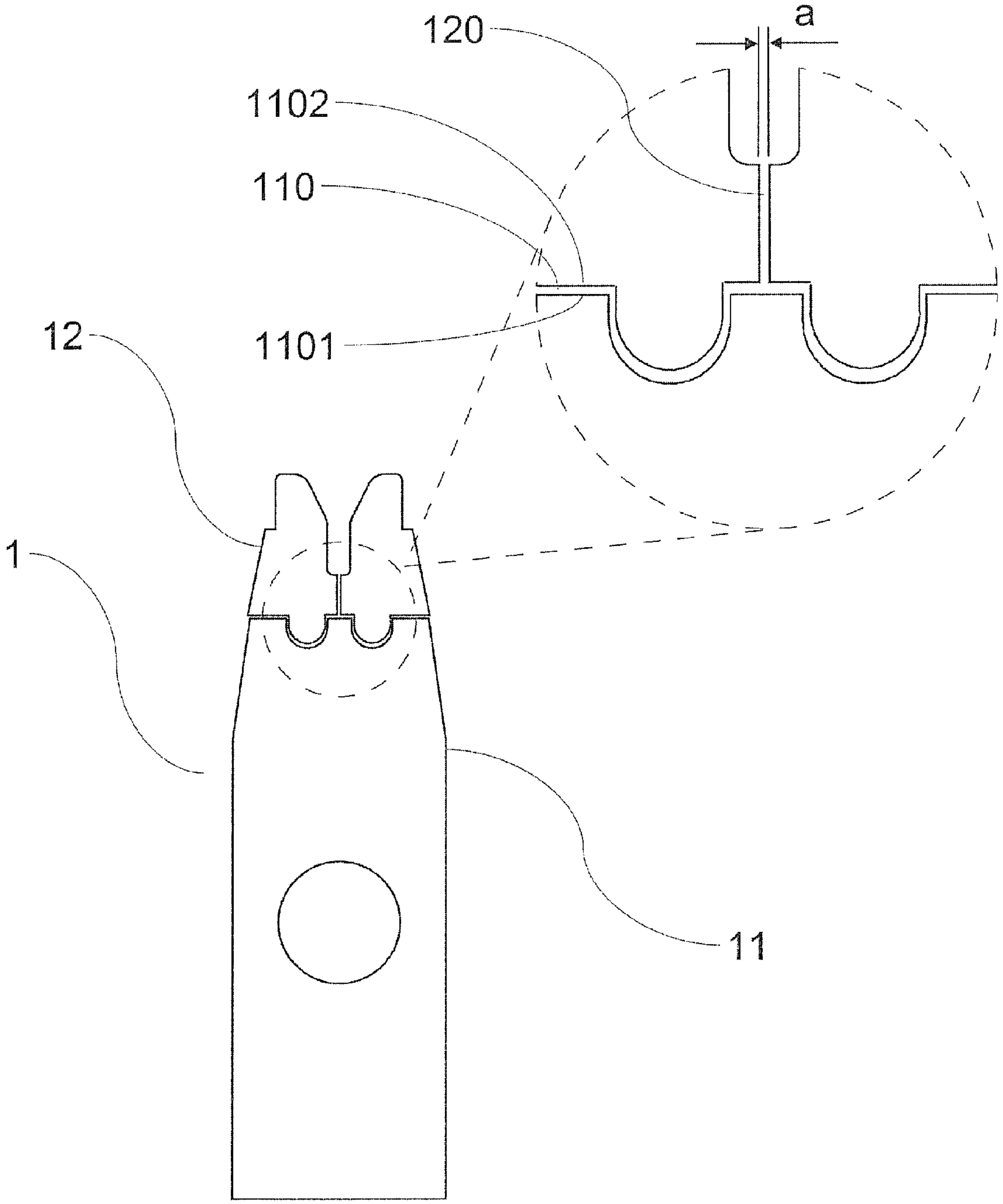
FIG. 3A is a partial schematic view of a main body according to the present invention.
Figure 3B:
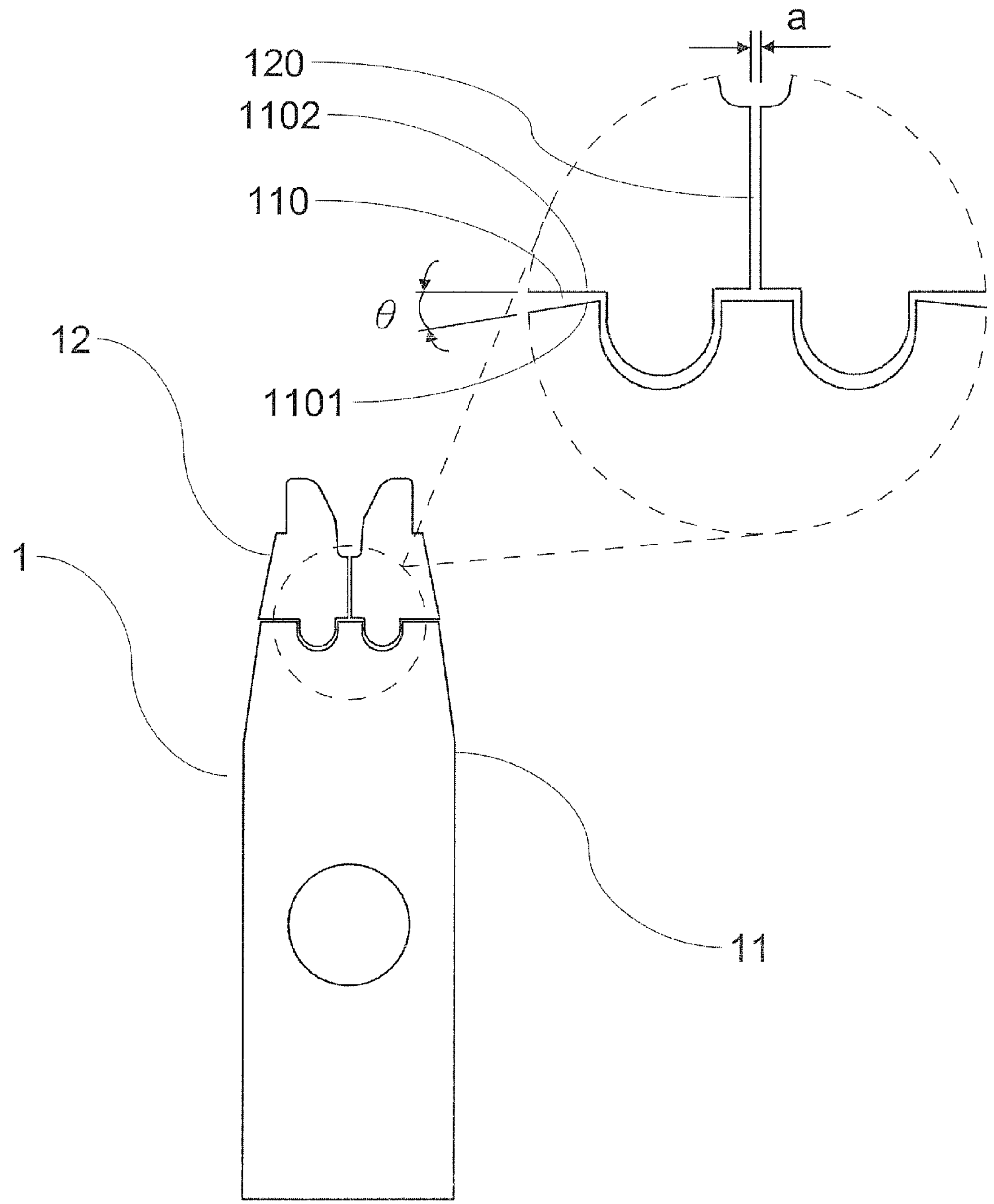
FIG. 3B is a partial schematic view of a third embodiment of the main body according to the present invention.

Referring to FIG. 3A, connection of the main body 11 and the pair of claws 12 enables a first slit 120 and the groove 13 to be formed between the pair of claws 12. The first slit 120 is of a width which is denoted by the symbol "a" in the drawing. The difference between the second width W2 and the first width W1 is not greater than the width "a" of the first slit 120. For better performance, the difference between the second width W2 and the first width W1 is preferably less than the width "a" of the first slit 120. A second slit 110 is formed between the main body 11 and each said claw 12. The second slit 110 borders the main body 11 on a first benchmark edge 1101 and borders each said claw 12 on a second benchmark edge 1102. The first benchmark edge 1101 and the second benchmark edge 1102 are parallel. Referring to FIG. 3B, in a third embodiment, an angle θ is included between the first benchmark edge 1101 and the second benchmark edge 1102.

Figure 4:
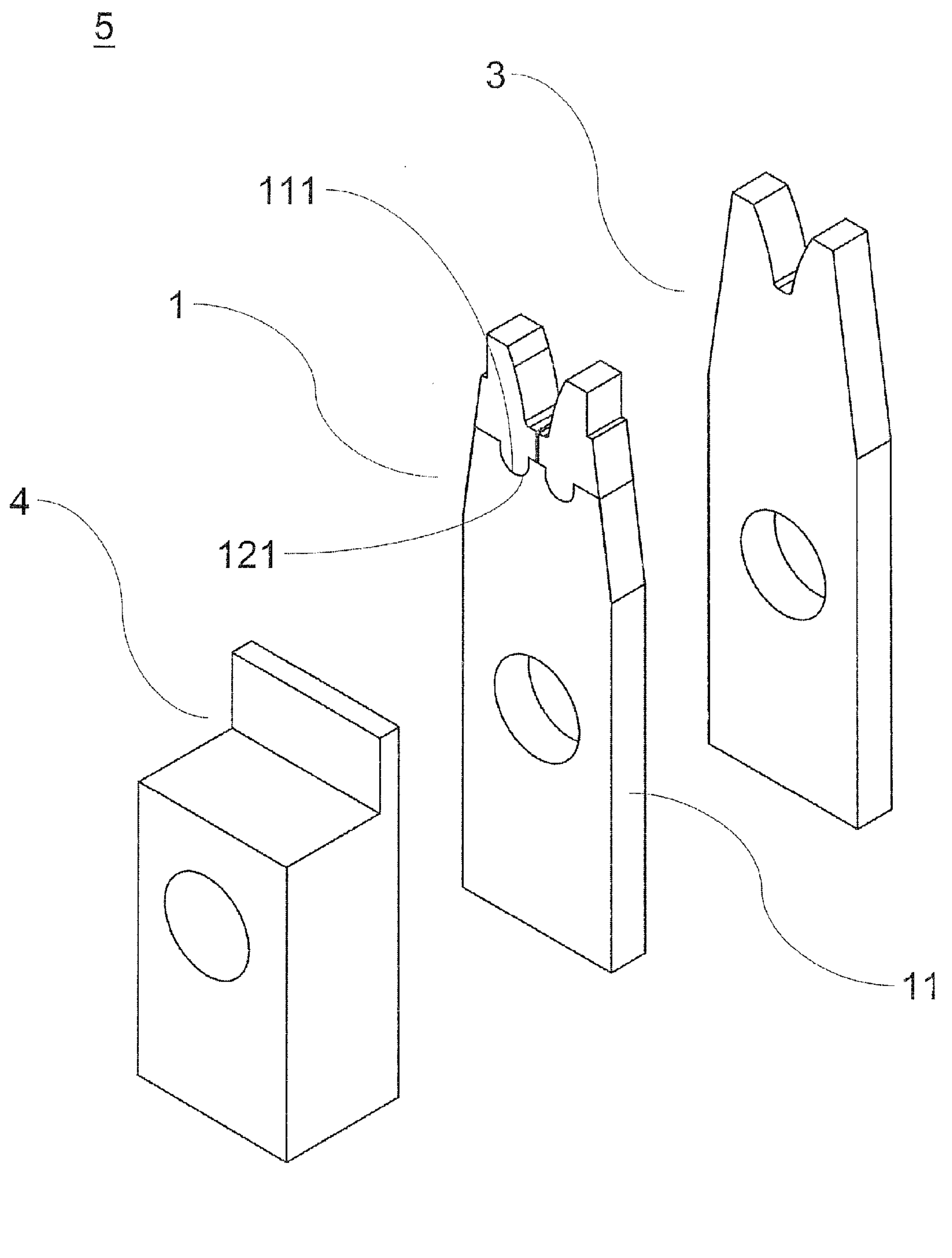
FIG. 4 is a schematic view of the terminal pressing mold assembly comprising a clamping element according to the present invention.

Referring to FIG. 4, the terminal pressing mold assembly 5 of the present invention further comprises a first clamping element 3 and a second clamping element 4, so as for the first mold 1 to be clamped between the first clamping element 3 and the second clamping element 4. As shown in the drawing, preferably, the first connecting portions 111 of the main body 11 and the second connecting portions 121 of the claws 12 are clamped between the first clamping element 3 and the second clamping element 4.

The foregoing description is intended to illustrate the preferred embodiments of the present invention, but is not intended to be restrictive of the scope of the claims of the present invention. The preferred embodiments illustrated with the foregoing description are comprehensible to and accomplishable by persons skilled in the art. Hence, all equivalent modifications and variations made to the preferred embodiments without departing from the spirit and principles embodied in the disclosure of the present invention should fall within the scope of the invention as set forth in the appended claims.

What is claimed is:

1. A terminal pressing mold assembly, essentially comprising a first mold provided with a groove and a second mold provided with a projection corresponding in position to and insertable into the groove, and the terminal pressing mold assembly being characterized in that:

the first mold comprises a main body and a pair of claws, the main body being provided with a pair of first connecting portions, and the pair of claws each being provided with a second connecting portion for connection with a corresponding said first connecting portion to thereby connect the pair of claws and the main body, so as to form a first slit and the groove between the pair of claws and form a second slit between the main body and each of the claws, wherein a pair of first guiding edges spaced apart by a first width are formed on outer sides of the pair of claws, respectively; and a pair of second guiding edges spaced apart by a second width and extended from a top side of the second mold are formed on two sides of the projection, the second width being not greater than the first width, wherein a difference between the second width and the first width is not greater than a width of the first slit.

2. The terminal pressing mold assembly of claim 1, wherein each of the first connecting portions is a dent portion, and each of the second connecting portions is a protrusion portion.

3. The terminal pressing mold assembly of claim 2, wherein each of the first connecting portions is a round-bottomed dent portion, and each of the second connecting portions is a round-headed protrusion portion.

4. The terminal pressing mold assembly of claim 1, wherein each of the second connecting portions is a dent portion, and each of the first connecting portions is a protrusion portion.

5. The terminal pressing mold assembly of claim 4, wherein each of the second connecting portions is a round-bottomed dent portion, and each of the first connecting portions is a round-headed protrusion portion.

6. The terminal pressing mold assembly of claim 1, wherein the second width is less than the first width, and a difference between the second width and the first width is less than the width of the first slit.

7. The terminal pressing mold assembly of claim 1, wherein a first guiding cape is formed at a joint between each of the first guiding edges and a corresponding said claw, and a second guiding cape is formed at a joint between each of the second guiding edges and a top side of the second mold.

8. The terminal pressing mold assembly of claim 7, wherein the first guiding cape and the second guiding cape are each of a chamfered shape.

9. The terminal pressing mold assembly of claim 7, wherein the first guiding cape and the second guiding cape are each of a right-angle shape.

10. The terminal pressing mold assembly of claim 1, wherein the second slit borders the main body on a first benchmark edge and borders each said claw on a second benchmark edge, the first and second benchmark edges being parallel.

11. The terminal pressing mold assembly of claim 1, wherein the second slit borders the main body on a first benchmark edge and borders each said claw on a second benchmark edge, the first and second benchmark edges including an angle therebetween.

12. The terminal pressing mold assembly of claim 1, wherein the claws are symmetric.

13. The terminal pressing mold assembly of claim 1, further comprising a first clamping element and a second clamping element so as for the first mold to be clamped between the first clamping element and the second clamping element.

14. The terminal pressing mold assembly of claim 13, wherein the first connecting portions of the main body and the second connecting portions of the claws are clamped between the first clamping element and the second clamping element.

* * * * *